March 31, 1925.

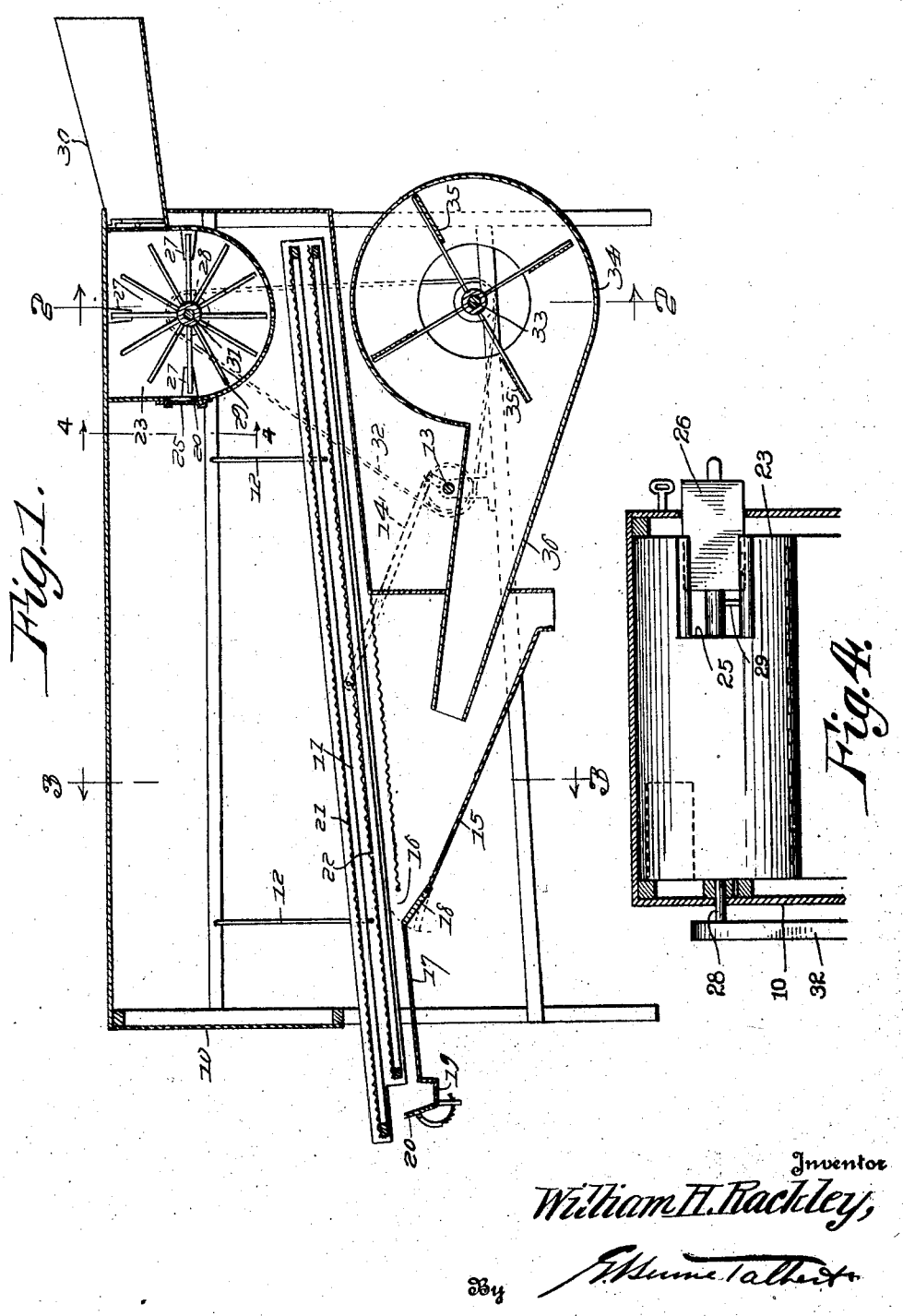

W. H. RACKLEY

THRASHER

Filed June 9, 1922

Inventor
William H. Rackley,

By

Attorney

Patented Mar. 31, 1925.

1,532,079

UNITED STATES PATENT OFFICE.

WILLIAM H. RACKLEY, OF DEVINE, TEXAS.

THRASHER.

Application filed June 9, 1922. Serial No. 567,120.

*To all whom it may concern:*

Be it known that WILLIAM H. RACKLEY, a citizen of the United States of America, residing at Devine, in the county of Medina and State of Texas, has invented new and useful Improvements in Thrashers, of which the following is a specification.

The object of the invention is to provide efficient mechanism for threshing such materials as cane, maize, kafir, soja beans, peas and the like and more particularly to provide means whereby a separation of the seed or grain from the chaff, fibre and waste materials may be effected by grinding or rubbing rather than by beating or tearing and without the risk of breaking or cracking the kernels of grains; and with this object in view the invention consists in a construction and combination of parts of which a preferred embodiment is shown in the accompanying drawings, wherein:—

Figure 1 is a longitudinal sectional view of an apparatus embodying the invention.

Figure 3:
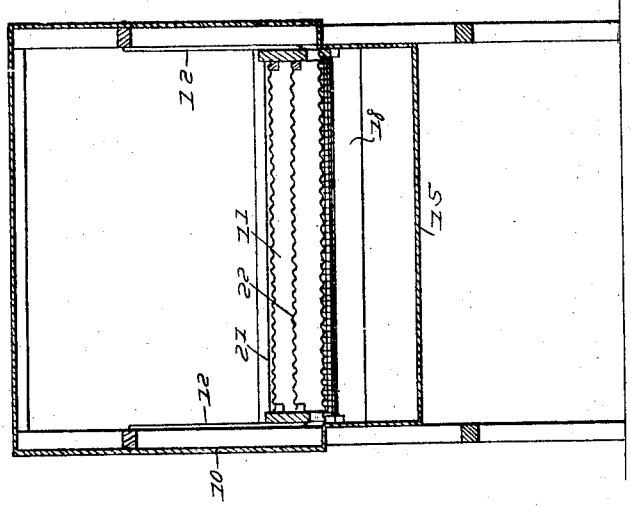
Figure 3 is a transverse sectional view on line 3—3 of Figure 1.
Figure 2:
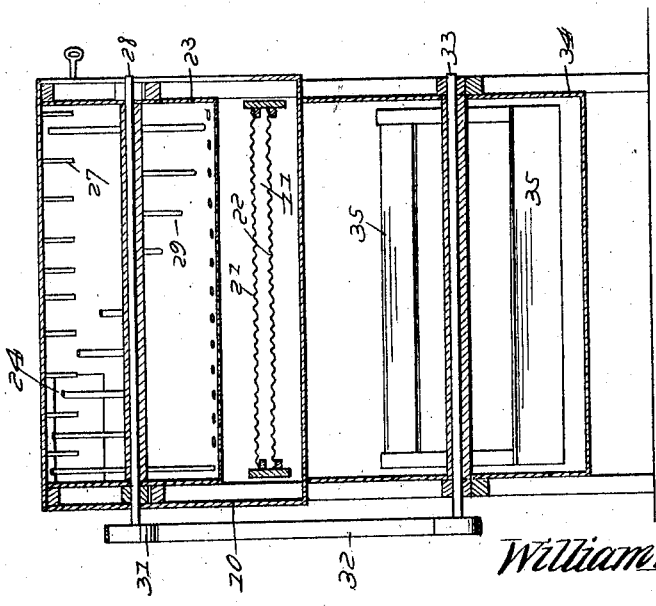
Figure 2 is a transverse sectional view on line 2—2 of Figure 1.

Figure 4 is a sectional view on line 4—4 of Figure 1, showing the restraining valve or closure 26 in elevation, partly open, and showing the opening 24 in dotted lines.

Within a suitable casing or housing 10 is suspended an inclined shaker screen 11 suspended by pendulous hangers 12 and actuable from a rotary shaft 13 through a pitman 14, a grain chute 15 being arranged beneath the screen to receive the cleaned and perfect grain from an outlet 16 in the pan 17 of said screen and being provided with an outlet gate 18 which is adjustable to vary the facility with which the screenings may escape from the pan to the chute and hence control the grade of the grain or seed, the light or inferior grain or seed being permitted to pass over said outlet opening and within an outlet through a spout 19 also preferably provided with a tail gate 20 which is adjustable to vary the tendency thereof to check the grain in its passage toward the discharge end of the screen and permit of a particularly low grade of seed or grain to pass over with the chaff or tailings.

The screen preferably consists of a plurality of dimensionally graded screens 21 and 22 to effect a more complete separation of the waste from the values.

Located above in position to discharge upon the screen is a cylinder 23 having at one end an inlet opening 24 formed in the cylindrical wall adjacent to one of its heads and provided at the other end but also in the cylindrical wall adjacent to the other head with an outlet opening 25 which is preferably provided with a controlling or restraining valve 26 adapted to be adjusted to afford a greater or less resistance to the escape of the contents of the cylinder and therefore a more protracted and severe rubbing and beating of the materials thereof to compensate for variations in the grade of materials to be cleaned. In addition to the outlet opening 25 being at the other head of the cylinder in the cylindrical wall thereof, it is located at a point a substantial distance above the screen bottom of the cylinder, and due to the location of the outlet opening 25, greater or less resistance to the escape of the contents of the cylinder is afforded, which insures a more protracted and severe rubbing and beating of the materials, it being obvious that the restraining valve may be set by hand. Said cylinder is provided on its cylindrical wall with inwardly directed teeth 27 and mounted for rotary motion within the same is a brush having a shaft 28 carrying fingers 29 extending radially from the shaft and arranged in intercurrent relation with the pins on the cylindrical wall, said fingers being arranged spirally to induce a feeding movement of the contents of the cylinder longitudinally or axially thereof from the inlet toward the outlet end. A feed chute 30 is arranged in communication with the inlet opening and the chaff of the brush is adapted to be actuated in common with the shaft 13 mounted on the drive pulley 31 which in this instance is shown applied to the shaft 28 which is connected by a belt 32 with said shaft 13 and a fan shaft 33 forming a part of a blower mechanism having a drum 34 and the blades 35. The blower drum is provided with an outlet or blast directing spout 36 which extends longitudinally above and substantially parallel with the grain chute 15 to discharge toward and through the grain outlet 16 from the plane of the shaker screen so as to separate light or imperfect grains or seeds from the perfect product and facilitate the removal of chaff and like fibres and other waste and cause the discharge of the latter over the tail end of the screen. By the adjustment of the tail board 16 controlling the outlet from the shaker pan to the grain chute, the force of the blast passing through said outlet may be modified or increased or diminished to further adapt the mechanism to effectively separate the light or imperfect grains or seeds from those which are in proper condition.

Having described the invention, what is claimed as new and useful is:—

1. A thrasher for the purpose indicated having a concave having a screen bottom provided with inwardly directed pins and a rotary beater mounted in the concave and having radial fingers disposed in inter-current relation with said pins, and spirally disposed with reference to the axis of movement, the concave having inlet and outlet openings adjacent to its ends, and the latter being located to one side of and above the screen bottom of the cylinder and provided with a choking or outlet controlling means.

2. A thrasher for the purpose indicated having a concave having a screen bottom provided with inwardly directed pins and a rotary beater mounted in the concave and having radial fingers disposed in inter-current relation with said pins, and spirally disposed with reference to the axis of movement, the concave having inlet and outlet openings adjacent to its ends, the latter located to one side of and above the screen bottom of the cylinder and having a valve for regulating the rapidity of discharge therethrough.

3. A thrasher for the purpose set forth comprising a frame including a concave at one end thereof and a rotary beater mounted in the concave having a screen bottom with radial pins and fingers disposed in inter-current relation on the cylinder and the beater respectively, said concave having at one end an inlet opening formed in the cylindrical wall adjacent one of its heads and provided at its other end but also in the cylindrical wall at the other head with an outlet opening, the inlet and outlet openings being in a position slightly above the center of the concave, the outlet opening being located a substantial distance above the screen bottom of the concave, and a controlling or restraining valve for the outlet opening adapted to be adjusted to afford a greater or less resistance to the escape of the contents of the concave and thereby assure a more protracted and severe rubbing and beating of the material in the concave.

In testimony whereof he affixes his signature.

WILLIAM H. RACKLEY.